United States Patent

Coron

[11] Patent Number: 5,131,125
[45] Date of Patent: Jul. 21, 1992

[54] LINEAR GUIDING MODULE FOR THE TRANSFER AND HANDLING OF ALL PARTS AND ACCESSORIES

[76] Inventor: Jean-Paul Coron, Chassenas, 69440 Saint Maurice Sur Dargoire, France

[21] Appl. No.: 673,226

[22] Filed: Mar. 21, 1991

[30] Foreign Application Priority Data

Mar. 22, 1990 [FR] France .............................. 90 03985

[51] Int. Cl.⁵ .......................... B23Q 5/34; F16C 29/06
[52] U.S. Cl. ................................. 29/33 P; 198/346.1; 384/45
[58] Field of Search ............... 409/235, 219, 172, 162; 29/563, 564, 33 P; 408/234; 384/15, 22, 39, 40, 41, 42, 43, 45, 49, 55; 198/346.1, 346.2

[56] References Cited

U.S. PATENT DOCUMENTS

| | | | |
|---|---|---|---|
| 2,522,695 | 9/1950 | Walter | 384/55 X |
| 3,405,600 | 10/1968 | Ballard | 409/146 X |
| 4,859,085 | 8/1989 | Buessinger et al. | 384/45 |
| 4,934,835 | 6/1990 | Albert | 384/43 |

FOREIGN PATENT DOCUMENTS 3040711 6/1982 Fed. Rep. of Germany ........ 384/40

Primary Examiner—William Briggs
Attorney, Agent, or Firm—Wall and Roehrig

[57] ABSTRACT

The module is remarkable in that it comprises a body (1) obtained by hollow extrusion with internal sides (1.3 and 1.4) and a rectilinear and horizontal bottom face provided with profiled fixing notches the bottom base (1.5) making up a supporting surface corresponding to the maxiumum width of the guide body, the length of the bottom base of the latter having a longitudinal opening enabling the positioning of a connecting strip and above, a longitudinal guided profile taking a guide rail (11) associated to the said strip, the said guide rail taking one or more transfer slides supporting a profiled saddle (3–17), and wherein the top edges (1.8) of the said body have a horizontal wing defining a top longitudinal slot enabling the said saddle (3–17) to be moved and sealing means to be positioned, and wherein the top part of the said saddle (3–17) has a narrow section (3.8) and (17.5) extending outside the said body and wherein a means inserted into the body provides controlled and limited longitudinal movement of the said saddle.

11 Claims, 4 Drawing Sheets

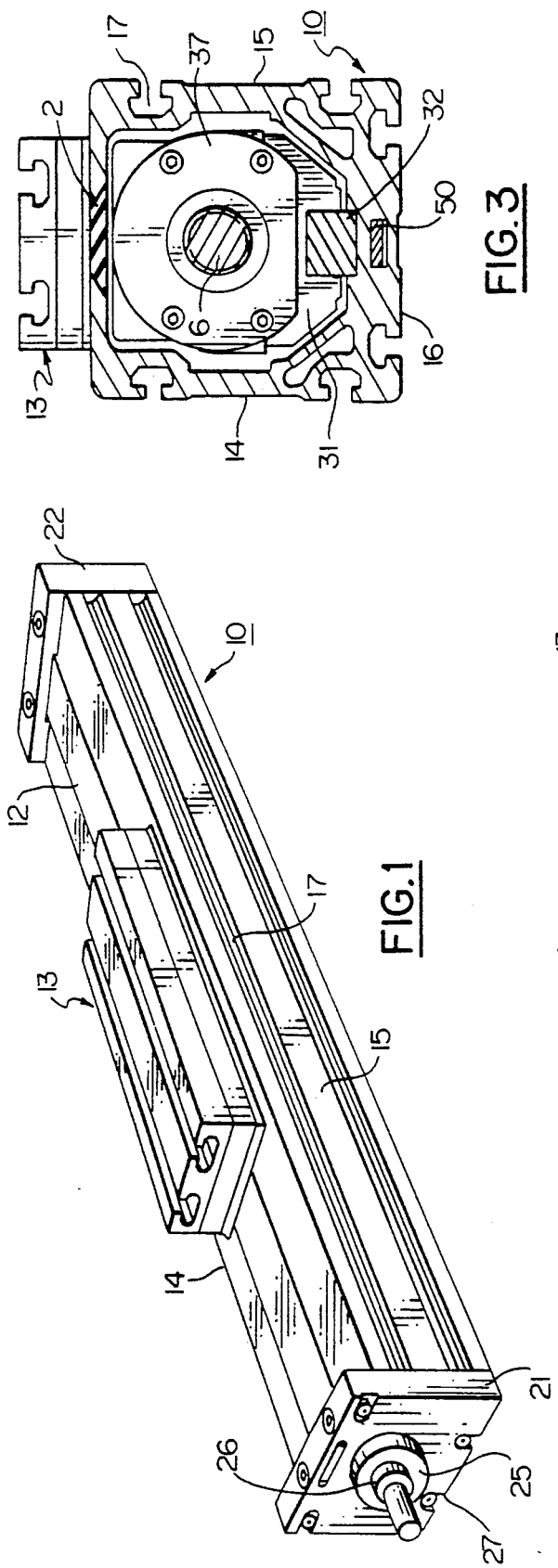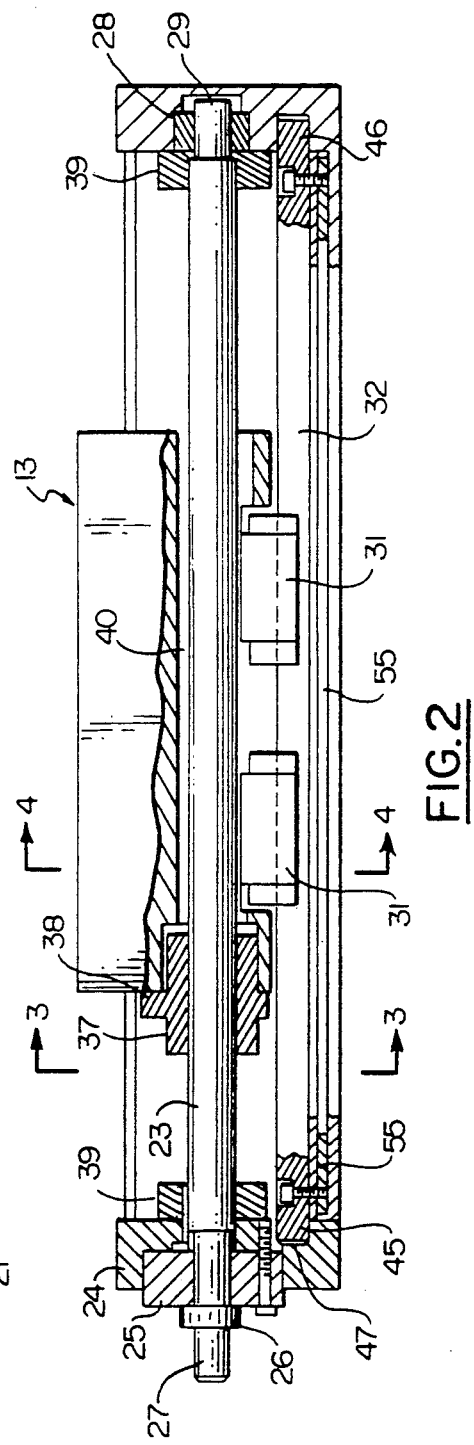

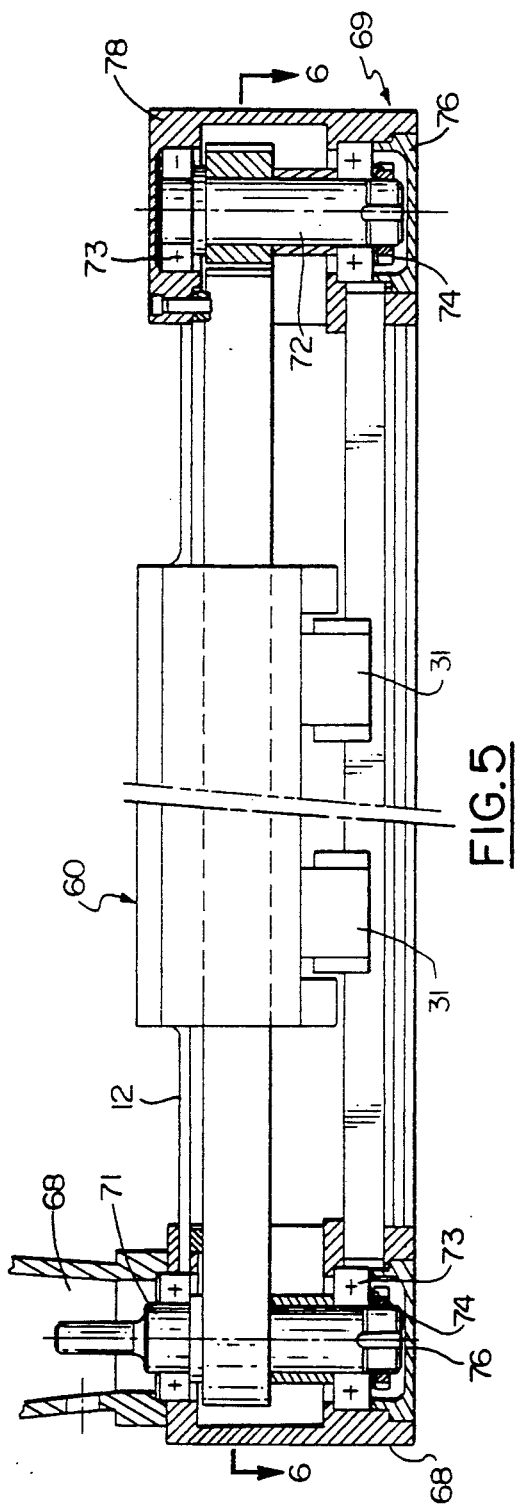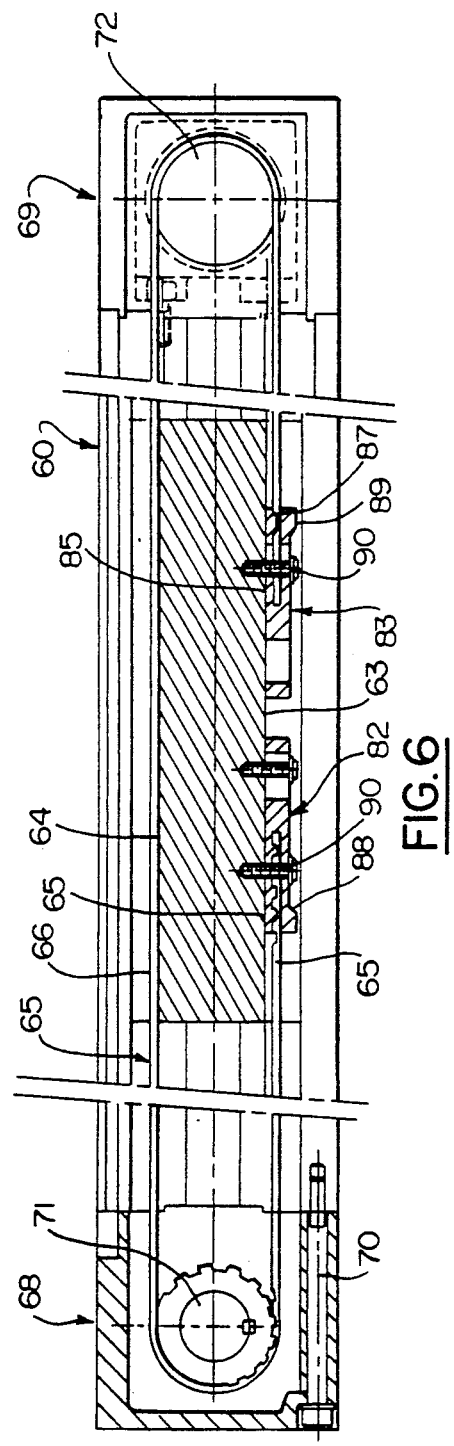

LINEAR GUIDING MODULE FOR THE TRANSFER AND HANDLING OF ALL PARTS AND ACCESSORIES

The invention relates to the technical sector of in line handling and transfer means for parts, particularly applicable to automation systems and particularly for machines, machine-tools, numerical control machining centers, industrial robots and all automatic feeding systems, measuring instruments, manipulators.

The design of linear modules for transfer and handling, has been known for many years and is widely marketed, particularly in the above-mentioned technical sectors. In general, this relates to components ready to be mounted which are fixed on to a supporting surface by the bottom part and provided with a profiled structure enabling reciprocating movement according to a determined cycle of a slide on which one or more parts or tools or others are fixed, likely to operate and take action according to a pre-determined cycle in a continuous reciprocating movement.

The above mentioned structure of the module is obtained by a stiff aluminum profiled shape obtained through an extrusion die, the inside of which has a space for guiding and moving the transfer slide. Ball screw, roller and others or toothed belt or cylinder guide and drive systems are used.

To protect the linear module and its internal mechanisms in particular, protective strips are used, in the case of a slide mounted on ball screws, or drive belts of the slide which protect mechanisms inside the structure. The drive belts are, for example, mounted between two drums or idlers or suchlike, located close to the ends inside the linear module. The belts are associated, in a fixed manner, to the transfer slide by all suitable connection means. The latter are generally proved with a horizontal slot made throughout the length to allow for the belts to pass. For example, this is the case of the linear module described in the German patent 3.815.595.

The linear module is therefore designed with a long body, inside which a saddle is moved, the top part of which is designed to take parts and/or accessories, whereas the bottom part is associated, whilst being laid and fixed onto a rectilinear flat surface of a slide providing its translation movement. The current profiles of the body are made in a H-shape in order to allow the saddle to pass and be positioned and the positioning of sealing means in the form of protective strips, bellows or others. Such a form is described, in particular, in the above mentioned German patent. However, it involves complex mounting of the sealing means and furthermore, it limits and reduces the inertia of the body of the module. Furthermore, the bottom face of the body of the module is provided with a central recess, to enable, firstly, the positioning of connecting and fixing means of a guide rail on which the saddle slides, and, secondly, the positioning of a protective and sealing strip. A specific adaptation for the body is required with such arrangements which limit the inertia of the body due to the shapes and notches provided. Furthermore, additional protective means for the lower drive belt, located in the bottom part of the body must be used. Besides, the body of the module is designed for only one type of sealing means. Furthermore, the positioning of the saddle on the slide(s) is random as it depends on the only fixing means, the latter being the only mechanical means to take up the lateral loads.

With these various disadvantages in mind, the aim sought after according to the invention was to design a new profile of the body of the module, of simple design and manufacture, providing it with the maximum of inertia taking the working stresses of the module into account.

Another aim was to design a module which enabled the use of different transfer means of the saddle, the top part of which projects from the body of the module, being designed to take parts and different accessories.

Another aim was to design a module ensuring perfect protection of the internal guide mechanisms of the saddle.

Another aim was to design a module on which different types of sealing means could be used in order to protect all the different mechanisms.

These aims and others will be made well apparent from the following description.

According to a first characteristic, the linear guiding module is of the type comprising a long profiled body, the inside of which takes a guide shaft, providing controlled movement of a profiled saddle, the top part of which projects outside of the aforementioned body thereby being likely to take parts or accessories, wherein the protective strip is arranged on the top surface of the body to provide, in connection with the movement of the saddle, protection for the mechanisms arranged inside the body, the said body being obtained by hollow extrusion, the inside of which having sides and a rectilinear and horizontal bottom face with profiled fixing notches, the bottom face making up a supporting surface corresponding to the maximum width of the guiding body, the top edges of said body having a horizontal wing defining a longitudinal top slot provided for the movement of said saddle and positioning of the sealing means, the top part of said saddle having a narrow section extending outside said body, and means inserted into the body enabling controlled and limited movement of said saddle, said linear guiding module is remarkable in that the bottom base of the body has a longitudinal opening over its length, enabling a connecting strip to be positioned and on top, a longitudinal guided profile taking a guide rail associated to the said strip, said guide rail taking one or more transfer slides supporting a profiled saddle.

According to another characteristic, the saddle is generally I-shaped in a particular advantageous manner for the drive of the saddle by belts.

According to another characteristic, the saddle is provided with a bottom base, located inside the body of the module extending by a narrow section arranged opposite the ends of the top edges of the body of the module and extending by its top part, outside the body of the module to take and have parts and accessories, wherein the bottom base of the saddle has a recess likely to position and center one or more transfer slides, fastening means coupling the saddle to the slides, and wherein the support base of the saddle has a peripheral edge enabling it to be centered and embedded with respect to the slide(s).

According to another characteristic, the inside of the side walls of the body has profiled recesses provided to position and guide a plurality of bodies forming side plates associated to tie rods and arranged on either side of the saddle.

These characteristics and others will be made well apparent from the following description.

In order to clarify the object of the invention, it is illustrated in a non-limitative manner with the figures of the drawings where:

FIG. 1 is a perspective view of the linear guiding module according to the invention with a first embodiment of the drive means of the saddle, this means being a screw.

FIG. 2 is a longitudinal section along line 1—1 of FIG. 1.

Figure 4:
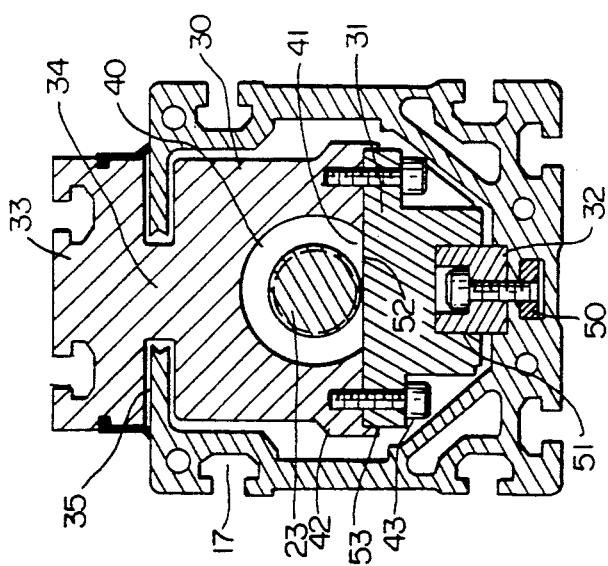

FIGS. 3 and 4 are cross sections along lines 3—3, and 4—4, respectively.

FIG. 5 is a longitudinal section of the linear guiding module according to the invention with a second implementation of the drive means of the saddle, this means being a belt.

FIG. 6 is a plane sectional view according to line 6—6 of FIG. 5 showing the fastening system of the belt in particular.

Figure 7:
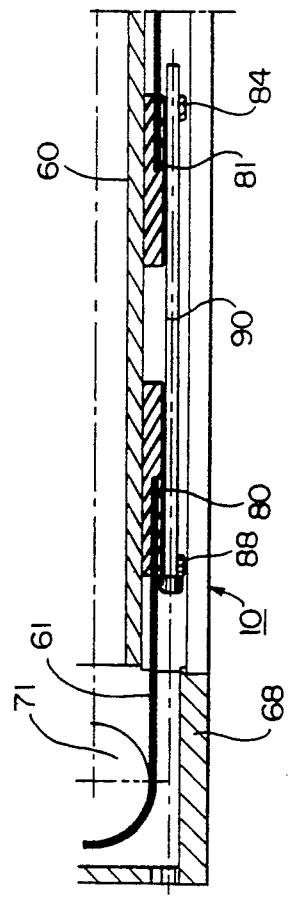

FIG. 7 is a semi-plane view according to FIG. 6 showing the tensioning of the fastening system of the belt.

Figure 8:
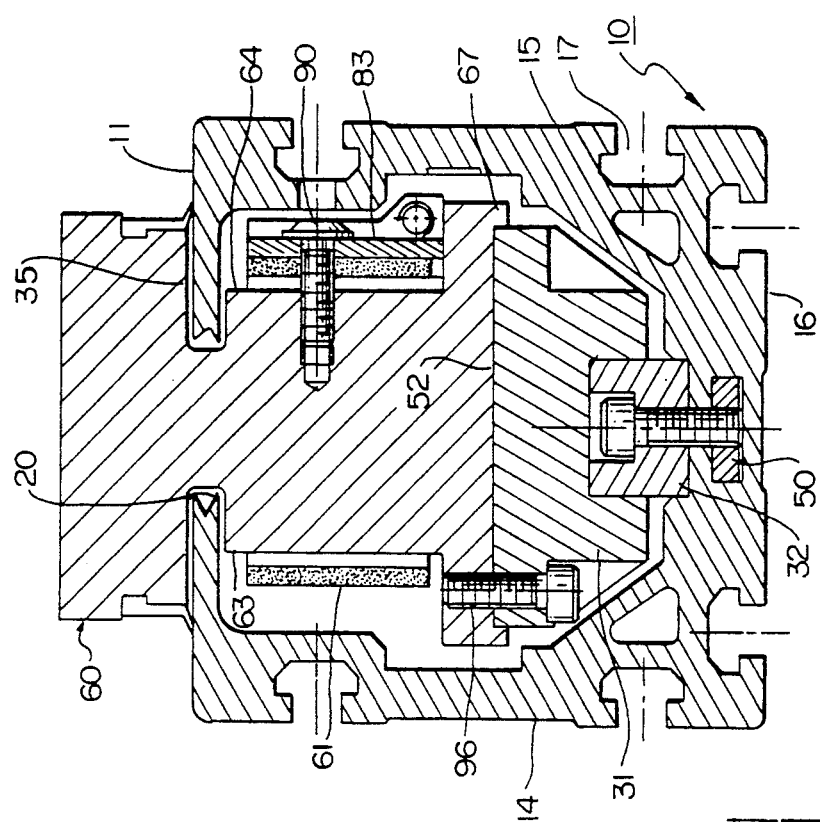

FIG. 8 is a cross section according to line 8—8 of FIG. 5.

Figure 9:
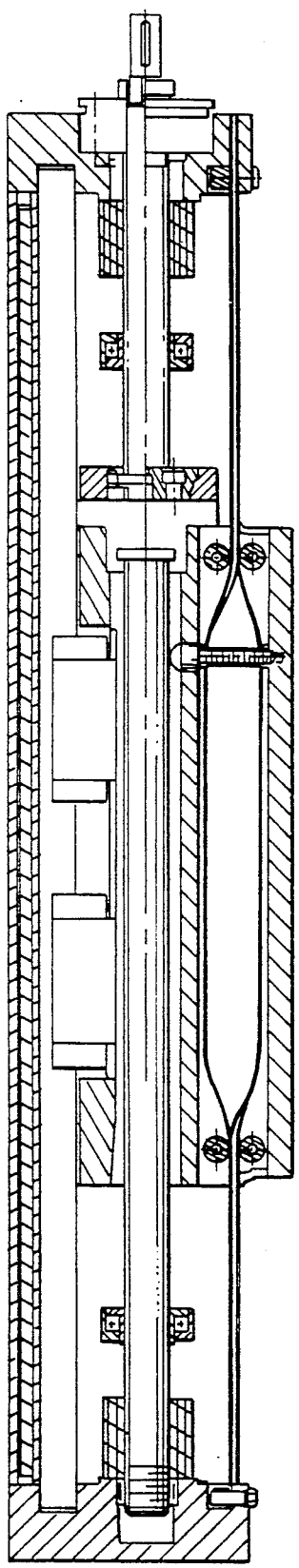

FIG. 9 is a partial longitudinal section similar to FIG. 2, illustrating additional guide means associated to the movement of the saddle.

Figure 10:
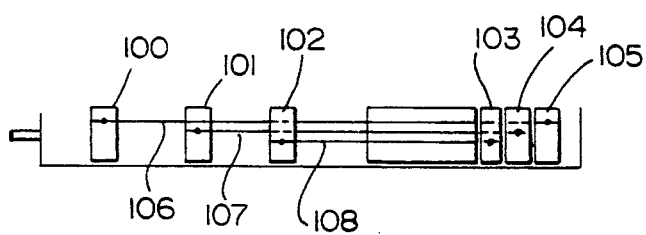

FIG. 10 is a schematic view showing the movement of the saddle in the linear guiding module with a plurality of additional guide means either side.

Figure 11:
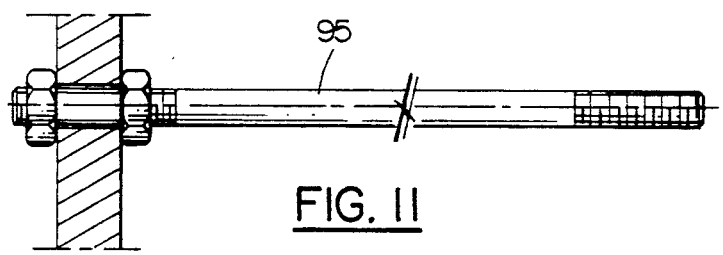

FIG. 11 is a view showing a tie rod associated to the different aforementioned means, in FIG. 10.

Figure 12:
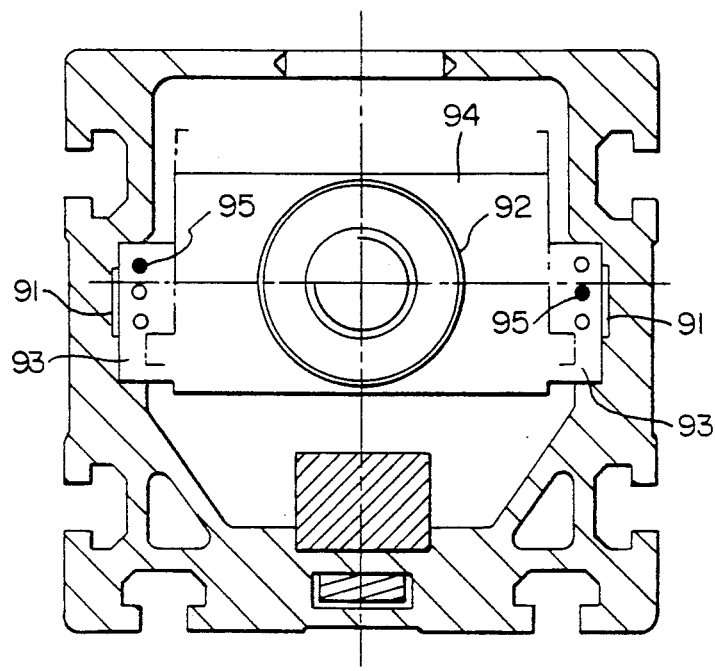

FIG. 12 is a section according to line 9—9 of FIG. 2.

In order to clarify the object of the invention, it is now described in a non-limitative manner when considered in conjunction with the embodiments of the drawings.

The linear guiding module comprises a body 10 made of aluminum, obtained by extrusion. The top face 11 of this hollow body has a horizontal slot or opening provided to position a sealing and protective belt 12 and the top part of the table or saddle 13 to pass, likely to take parts or accessories.

The sides 14-15 of the body 10 and its bottom rectilinear face 16, has profiled notches 17 provided to position clamping and fixing means with respect to a supporting surface. The bottom base of the body has profiled lightening openings 18. The bottom base is horizontal and uses the maximum width of the guiding body as a supporting surface in order to provide the maximum of inertia to the body. The middle part of the bottom base of the body has a longitudinal opening over its length, in which a connecting strip 19 can be positioned, this arrangement enabling, with the same volume of the body, the inertia to be reduced thereby preserving a bottom supporting plane, without recess.

As shown in FIGS. 3, 4 and 7, the top part of the body has edges 20 forming a wing defining a small slot for a protective strip to pass and be positioned, these edges are made, if required, with a profile to enable the protective strip to be maintained and held, as a function of the characteristics of the sealing device chosen.

The side ends of the body are provided with front and rear side plates 21 and 22 which are fixed to the said body by any suitable connecting means.

The side plates are designed and profiled to close and block the ends of the body 10 and are fixed to the latter by connection screws. Besides and in a first implementation of the saddle moving mechanisms, illustrated in FIGS. 1 and 4, the central part is designed to enable the guiding and rotation of a guiding shaft 23 arranged over the length of the body. For this purpose, the front side plate 21 has an internal shoulder 23 enabling bearings 25 in which the guide shaft rotates, to be positioned. The fixed part of the bearing is integral to the body by connection screws, whereas the guide shaft projects outside the body and is designed to take a locking nut 26 abutting against the bearing. The front end 27 of the guide shaft projects to enable it to be driven by any suitable drive means. The rear side plate 22 is also provided with a central bore 28 for the other end 29 of the guide shaft to be inserted. The bearings 21 and 22 have other arrangements which will be described elsewhere. The linear module enables controlled longitudinal movement of the saddle which is likely to be moved along the body by reciprocating according to a pre-determined cycle. The saddle has two distinct parts, i.e. a profiled base 30 likely to surround the guide shaft 23 and be applied against and centered on one or more transfer slides 31 which are moved on a guide rail 32 arranged in the bottom of the body 10. Besides, this saddles has a top part 33 in the extension of the previous one, with a profile adapted to define a narrow section 34 then breaking through to the outside of the body to make up a support table for the parts and accessories. Therefore, either side of the middle part of the saddle there are two slots or notches 35 coming into engagement around the profile of the top wings 20 of the body.

The front face of the saddle is also provided with a bore 36 enabling a round nut 37 mounted on the guide shaft, to be positioned, the said round nut has a collar or external flange 38 likely to abut at the front and be fixed against the saddle. The rotation of the transfer shaft around itself therefore causes the controlled linear movement of the round nut and thrust of the saddle. Furthermore, it is possible to arrange a second round nut 31 on the guide shaft 23 opposite the previous one to stress and pre-set the assembly. Furthermore, dampening components 39 are mounted on the screw and make up end of stroke stops for the saddle.

As shown in the drawings, the base of the saddle has an open central recess 40 likely to surround the transfer shaft by breaking through the lower outside face of the saddle in order to make up a recess 41 likely for the slide(s) 31 to be positioned and centered. The bottom base of the saddle also has profiles or lugs 42 provided to insert the connecting and fastening means 43 of the fixing screw type in order to couple it onto the slide(s).

The slide(s) are made in the form of bodies being applied against and guided on a rail 32 arranged along the body of the module and in a longitudinal recess 44 provided, for this purpose, and the ends 45, 46 of which are inserted into and applied against profiled openings 47, 48 formed on the front and rear side plates of the module. By this assembly, constant, even parallelism is provided between the axes of the rail and transfer shaft. A connecting means 16 of the screw type, is provided to position the rails and subsurface strip 50. Therefore, the slides, two in this case, the number of which is a function of the load applied to the saddle, are provided with a U-profile 51 recess at the base so as to be adapted and straddle the rail, whereas the top part has a rectilinear and horizontal support beam 52 on which the bottom base of the saddle is applied.

According to a significant arrangement of the invention and as shown in the drawings, the support base 41 of the saddle has a peripheral edge 53 enabling it to be centered and embedded with respect to the slide(s). The latter are situated in the bottom part of the body of the modules. This arrangement of the saddle with respect to the slide is provided to obtain precise and non-random positioning. Besides, the walls of this recess allow lateral loads to be transmitted, completely independent from the connecting and fastening means on the slides.

The design defined by the module provides it with substantial inertia and total protection from the outside environment of the different mechanism and drive and movement means of the saddle. Besides, the body of the linear module is more compact.

The sealing means likely to protect and cover the top longitudinal slot of the body of the module can be of any type. A protective strip, integral or not integral to the top edges of the body, thereby crossing the longitudinal saddle and in any suitable manner, can be used. In this case, the top part of the saddle is provided with a profiled opening for the strip to pass and be guided. As an alternative model, a sealing device made up of bellows in a known way, may be used. According to another arrangement and special feature of the invention, the body of the linear module is made without changing the aforementioned characteristics in order to enable another saddle moving mechanism to be inserted, as illustrated in FIGS. 5 to 8. This mechanism is a belt drive. Parts similar in both embodiments maintain the same references. By referring to FIG. 8, it can be observed that the modular body is of strictly the same design as before and is provided, in particular, with a horizontal bottom base (1.5), top horizontal wings, leaving a slot for the saddle and any sealing means to pass. The bottom part of the body is designed to take a rail 32 and strip 50 with a connecting means 55 of the aforementioned type. Slides 31 are provided at the U-shaped base 56 so as to be adapted and straddle the rail 32.

With this embodiment, the saddle 60 is of practically the same design as saddle 13, the only difference being that it is designed to cooperate and be driven by a belt 61 arranged in a horizontal plane with vertical falls, and not by a screw as previously described. For this purpose, the part of the saddle 60 subjacent to the top edge of the body has a block 62 with two faces 63,64 parallel and rectilinear in the middle so as to be opposite the passage for the falls 65,66 of the drive belt. The ends can be relieved so as to facilitate the passage of the belt. The said block is extended at the bottom part by a base 67 applied against and centered on the slides 31 of the aforementioned type. Means 96 of the bolt type, provide the connection between the saddle and the slides.

Therefore, the general shape of the saddle is an I-profile which is particularly advantageous for its belt drive. As shown, the falls of the belt 61 are located in a vertical plane and are built into the inside of the body of the module, thereby being perfectly protected from the outside and without having any special arrangement of the body of the module. By referring to FIGS. 5 and 7 of the drawings, it can be seen that the transversal ends of the body 10 of the linear module, take two plates forming end pieces 68,69 which are fixed to the body by bolting 70 or suchlike.

Each end piece 68,69 is provided with internal openings and collars to each take a shaft or drive drum 71 and shaft or driven drum 72 running in bearings 73, locking means 77 fixing and holding the assembly. The end piece 68 is provided with a top opening 75 for the drive shaft 71 to pass with a view to it being coupled with a drive motor means. A blank plate 76 is arranged in the bottom opening and enables access to the locking means of the shaft. The other end piece 69 is also provided with an opening 77 in the bottom part so as to take a blank plate 76. On the other hand, the top part 778 of the end piece is blocked and is used as a housing for bearing means 73.

Between shafts 71,72 a belt is arranged, the length of which crosses the body of the linear module being opposite the rectilinear and parallel faces 63,64 of the saddle. In order to drive the belt, all or part of the length and internal face can be provided with teeth likely to cooperate with a complementary notched part formed on the drive shaft 71. Furthermore, the driven shaft may, if required, also be toothed according to the applications required from the linear module. The shafts 71,72 are in a fixed position. By referring to FIG. 6, the belt 61 is attached and fixed at the ends 80,81, opposite one of the faces 63,64 of the saddle. This fixing is operated, for example, in order to provide possible tensioning of the belt. Components forming clamps 82,83 are built up against the wall of the saddle and are fixed to it by bolting or suchlike. The internal face 84,85 of the part forming a clamp can be toothed and cooperate with complementary notches partially made on the corresponding face of the saddle. Therefore, by bringing the clamps together with respect to the fixing means on the saddle, the belt can be more or less tensioned. These clamps are provided internally with openings 86,87 in which the ends of the said belt are inserted, clamping means being provided to hole them.

FIG. 7 illustrates the clamping means of the belt by bringing the ends together. More particularly, the ends of the clamps 86,87 have raised edges 88,89 provided with thread openings for a tensioning screw 90 to pass.

With this embodiment, it can be seen that, by preserving the profile of the body of the linear module, the drive belt and movement of the saddle are fulled protected from the outside. Besides, there is no weakening zone of the body of the module for the belt falls to pass.

Sealing means to take the top slot of the body of the linear module are then built up in any suitable manner. These sealing means can be bellows, protective strips being adjusted or not adjusted in the slot formed between the top edges forming wings of the body.

FIG. 9 to 12 of the drawings illustrate an additional arrangement of the linear guiding module, capable of being used as the moving and drive means of the saddle.

As illustrated in the drawings, the inside of the body of the module on the opposing side edges, has a recess 91 provided for the insertion, positioning and guiding of one or several parts 94 forming plates arranged transversely in the module. The central part of these plates can be provided with an opening 92 for the passage of a guide shaft 23 described as a first moving means of the saddle. The ends 93 of these plates are provided with bearing surfaces coming into engagement and being centered in the said recesses. These plates are mounted, so as to be guided, on a plurality of tie rods 95, the number of which corresponds to the number of plates associated to the saddle. More particularly, the saddle with the different plates arranged either side, is therefore illustrated in FIG. 10. The plates 100–105 are associated, in pairs, by the tie rods 106–108. The latter freely cross the saddle. The plates and associated tie rods are connected by bolting or suchlike. It is therefore noticed that when the saddle is moved in one direction or another, the different plates from one side are successively moved, thereby moving and driving the plates arranged the other side of the saddle. This complementary arrangement completes the guiding of the assembly and supports the screw. The number of plates 94 may vary according to the requirements and length of the linear module and due to this, as a function of the length of the screw. The number of plates is also a function of the diameter of the screw and its rotation speed. The originality of this feature therefore lies with the specific arrangement of the internal body of the module with the aforementioned recesses 91 to enable the aforementioned plates to be positioned thereby providing complementary guiding in the profile of the body of the linear module.

As illustrated in FIG. 12, the plates have openings for the positioning and fixing of the tie rods in the reversed and alternate position.

The advantages are made well apparent from the invention. It is necessary to particularly highlight the new design of this body which offers better inertia to external stresses. Thanks to its design, this body is independent of any saddle drive system. Furthermore, the saddle moving mechanisms are fully protected. It is also to be noticed that there is constant and even parallelism between the rail and transfer shaft.

What is claimed is:

1. A linear guiding module comprising a hollow extruded body having a horizontal base corresponding to the maximum width of said body containing profiled fixing notches, said body further wings horizontally extended from the top of each side defining a longitudinally extended slot, a saddle having a narrow section located in said slot, an extended top section situated outside said body and an extended bottom section situated inside said body, a guide shaft mounted inside said body that operatively engages said body section of the saddle to reciprocally move said saddle longitudinally along said body, a connecting strip mounted in a longitudinally extended opening formed in said base, said strip extending along the entire length of said body, a guide rail mounted inside said body in a recess formed in the top of said base over said strip, means to connect said guide rail to said strip, slide means mounted on the bottom section of said saddle and being arranged to move along the guide rail, said bottom section of the saddle having a pair of opposed peripheral edges that pass downwardly along opposite sides of the slide means to center the saddle on said slide means, and a protective strip means mounted within the slot between the wings to protect the inside of said body.

2. The module of claim 1 wherein said slide means further includes a plurality of slide members aligned longitudinally upon the saddle and a pair of side plates mounted at opposite ends of the body.

3. The module of claim 2 that further includes a pair of oppose end pieces mounted inside the body adjacent to the side plates that contain openings for supporting said guide shaft, a nut means mounted in said saddle that is mated to said guide shaft.

4. The module of claim 1 that further includes damping means mounted within said body at each end thereof to arrest the longitudinal movement of said saddle.

5. The module according to claim 1 that further includes a pair of opposed profiled end pieces affixed to said body, a drive shaft mounted in one end piece and a drive shaft mounted in the other end piece, a belt means running between said shafts having vertically disposed falls that are arranged to pass along parallel faces of said saddle as means to secure the saddle to said belt.

6. The module of claim 5 wherein a part of the saddle adjacent to said wings contains a block means having two parallel faces rectilinear in said middle part opposite the belt falls, and means to affix said belt to one of said faces.

7. The module of claim 6 wherein the belt is affixed to one of said faces by an adjustable clamp means whereby the tension on said belt may be adjusted.

8. The module of claim 7 wherein said clamp means have extensions with threaded openings containing threaded tensioning members for engaging said belt.

9. The module of claim 1 wherein the belt contains teeth for mating with teeth on said drive shaft.

10. The module of claim 1 wherein the opposed side walls of said body have profiled recesses for positioning and guiding a plurality of plates connected to the rods coupled to the saddle on either side thereof.

11. The module of claim 2 wherein the saddle is I-shaped.

* * * * *